US012725636B2

(12) United States Patent
Zhou et al.

(10) Patent No.: US 12,725,636 B2
(45) Date of Patent: Sep. 1, 2026

(54) VIDEO MERGING METHOD, DEVICE, EQUIPMENT AND MEDIUM

(71) Applicant: Beijing Zitiao Network Technology Co., Ltd., Beijing (CN)

(72) Inventors: Caijin Zhou, Beijing (CN); Lei Zhang, Beijing (CN); Zihe Zhang, Beijing (CN); Yao Zhang, Beijing (CN); Guohong Wu, Beijing (CN); Wenyue Li, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 132 days.

(21) Appl. No.: 18/688,705

(22) PCT Filed: Sep. 2, 2022

(86) PCT No.: PCT/CN2022/116762
§ 371 (c)(1),
(2) Date: Mar. 1, 2024

(87) PCT Pub. No.: WO2023/030491
PCT Pub. Date: Mar. 9, 2023

(65) Prior Publication Data

US 2024/0363145 A1 Oct. 31, 2024

(30) Foreign Application Priority Data

Sep. 2, 2021 (CN) ......................... 202111028324.2

(51) Int. Cl.
*G11B 27/031* (2006.01)
*G06V 20/40* (2022.01)

(52) U.S. Cl.
CPC ............ *G11B 27/031* (2013.01); *G06V 20/46* (2022.01); *G06V 20/49* (2022.01)

(58) Field of Classification Search
CPC ...... G11B 27/031; G06V 20/46; G06V 20/49; H04N 5/262; H04N 5/265; H04N 5/272
(Continued)

(56) References Cited

U.S. PATENT DOCUMENTS 7,882,258 B1 2/2011 Sumler et al.
9,813,725 B1 * 11/2017 Yu ...................... H04N 21/8358
(Continued)

FOREIGN PATENT DOCUMENTS

CN 101778246 A 7/2010
CN 105096799 A 11/2015
(Continued)

OTHER PUBLICATIONS

English Translation of Chinese Publication CN112367481 Feb. 2021 (Year: 2021).*
(Continued)

*Primary Examiner* — Loi H Tran
(74) *Attorney, Agent, or Firm* — Astute IP Law Group

(57) ABSTRACT

A video merging method, a device, an equipment and a medium are provided, and the method includes: obtaining a first video clip and a second video clip which are to be merged; performing image processing on the first video clip and the second video clip, wherein the first video clip after the image processing and the second video clip after the image processing have a same picture display effect, in which the picture display effect includes an image quality and/or a picture style; performing audio processing on the first video clip and the second video clip, wherein the first video clip after the audio processing and the second video clip after the audio processing have a same background sound; and merging the first video clip after the image processing and the audio processing with the second video clip after the image processing and the audio processing.

11 Claims, 4 Drawing Sheets

(58) Field of Classification Search
USPC .......................................................... 386/285
See application file for complete search history.

(56) References Cited

U.S. PATENT DOCUMENTS

| | | | | |
|---|---|---|---|---|
| 12,334,047 | B1 * | 6/2025 | Warnick | G10L 21/0272 |
| 2013/0147896 | A1 | 6/2013 | Cook et al. | |
| 2020/0411059 | A1 * | 12/2020 | Cui | G11B 27/031 |

FOREIGN PATENT DOCUMENTS

| | | | |
|---|---|---|---|
| CN | 109040619 | A | 12/2018 |
| CN | 109379633 | A | 2/2019 |
| CN | 111556254 | A | 8/2020 |
| CN | 112203140 | A | 1/2021 |
| CN | 112367481 | A | 2/2021 |
| CN | 112822563 | A | 5/2021 |

OTHER PUBLICATIONS

English Translation of Chinese Publication CN106506983 Mar. 2017 (Year: 2017).*

"Deezer source separation library including pretrained models," GitHub, retrieved from https://github.com/deezer/spleeter, 5 pages.

International Search Report for PCT/CN2022/116762, mailed Nov. 14, 2022, 14 pages.

Li et al., "Learning Linear Transformations for Fast Image and Video Style Transfer", 2019 IEEE/CVF Conference on Computer Vision and Pattern Recognition (CVPR), 2019, 9 pages.

Marnerides et al., "ExpandNet: a Deep Convolutional Neural Network for High Dynamic Range Expansion from Low Dynamic Range Content", Computer Graphics Forum, vol. 27, No. 2, May 2018, 14 pages.

Office Action for Chinese Patent Application No. 202111028324.2, mailed on Feb. 10, 2025, 17 pages.

* cited by examiner

VIDEO MERGING METHOD, DEVICE, EQUIPMENT AND MEDIUM

CROSS-REFERENCE TO RELATED APPLICATION(S)

This is a national stage application based on International Patent Application No. PCT/CN2022/116762, filed Sep. 2, 2022, which claims the priority to Chinese patent application No. 202111028324.2 filed on Sep. 2, 2021 entitled "VIDEO MERGING METHOD, DEVICE, EQUIPMENT AND MEDIUM", the disclosures of which are incorporated herein by reference in their entireties.

TECHNICAL FIELD

The present disclosure relates to the field of video processing technology, in particular to a video merging method, a device, an equipment and a medium.

BACKGROUND

In many application scenarios, it is necessary to merge specified clips of two videos to form a new video. In the prior art, two video clips are usually merged together directly, but the applicants found through research that since shooting conditions or post-processing techniques of the two videos are mostly different, the method of directly merging two video clips together will make the merged video have a more obvious sense of fragmentation, which will provide the user with an overall, poor visual effect.

SUMMARY

In order to solve the above technical problems or at least partially solve the above technical problems, the present disclosure provides a video merging method, a device, an equipment and a medium.

An embodiment of the present disclosure provides a video merging method, including: obtaining a first video clip and a second video clip which are to be merged; performing image processing on the first video clip and the second video clip, wherein the first video clip after the image processing and the second video clip after the image processing have a same picture display effect, and wherein the picture display effect includes an image quality and/or a picture style; performing audio processing on the first video clip and the second video clip, wherein the first video clip after the audio processing and the second video clip after the audio processing have a same background sound; and merging the first video clip after the image processing and the audio processing with the second video clip after the image processing and the audio processing.

Optionally, the performing image processing on the first video clip and the second video clip includes: determining a target picture display effect; and converting both an original picture display effect of the first video clip and an original picture display effect of the second video clip into the target picture display effect.

Optionally, the determining the target picture display effect includes: using a preset picture display effect as the target picture display effect; or determining the target picture display effect according to the original picture display effect of the first video clip and the original picture display effect of the second video clip.

Optionally, the picture display effect includes the image quality and the picture style; the determining the target picture display effect according to the original picture display effect of the first video clip and the original picture display effect of the second video clip includes: selecting one of an original image quality of the first video clip and an original image quality of the second video clip as a target image quality; selecting one of an original picture style of the first video clip and an original picture style of the second video clip as a target picture style; and determining the target picture display effect based on the target image quality and the target picture style.

Optionally, the selecting one of the original image quality of the first video clip and the original image quality of the second video clip as the target image quality includes: selecting one of the original image quality of the first video clip and the original image quality of the second video clip as the target image quality according to a preset quality selection strategy; wherein the quality selection strategy includes: quality selection based on user instructions or quality selection based on an image quality comparison result between the first video clip and the second video clip.

Optionally, the selecting one of the original picture style of the first video clip and the original picture style of the second video clip as the target picture style includes: selecting one of the original picture style of the first video clip and the original picture style of the second video clip as the target picture style according to a preset style selection strategy; wherein the style selection strategy includes: style selection based on user instructions, style selection based on video sources, or style selection based on clip sorting positions.

Optionally, the converting the original picture display effect of the first video clip and the original picture display effect of the second video clip into the target picture display effect includes: determining the original picture display effect that is inconsistent with the target picture display effect based on the original picture display effect of the first video clip and the original picture display effect of the second video clip, and using the inconsistent original picture display effect as a picture display effect to be converted; converting the original image quality in the picture display effect to be converted into the target image quality in the target picture display effect by using a preset image quality conversion algorithm; wherein the image quality conversion algorithm includes a conversion algorithm between LDR and HDR; and migrating the target picture style in the target picture display effect to the picture display effect to be converted by using a preset style migration algorithm, so that the original picture style of the picture display effect to be converted is adjusted to match the target picture style.

Optionally, the performing audio processing on the first video clip and the second video clip includes: obtaining an original background sound of the first video clip and an original background sound of the second video clip; determining a target background sound; and converting both the original background sound of the first video clip and the original background sound of the second video clip into the target background sound.

Optionally, the obtaining the original background sound of the first video clip and the original background sound of the second video clip includes: extracting a first specified type of sound contained in the first video clip, and using other sounds except the first specified type of sound as the original background sound of the first video clip; and extracting a second specified type of sound contained in the second video clip, and using other sounds except the second specified type of sound as the original background sound of the second video clip.

Optionally, the determining the target background sound includes: using a preset background sound as the target background sound; or determining the target background sound based on the original background sound of the first video clip and the original background sound of the second video clip.

Optionally, the determining the target background sound based on the original background sound of the first video clip and the original background sound of the second video clip includes: selecting one of the original background sound of the first video clip and the original background sound of the second video clip as the target background sound; or fusing the original background sound of the first video clip with the original background sound of the second video clip to obtain the target background sound.

Optionally, the converting both the original background sound of the first video clip and the original background sound of the second video clip into the target background sound includes: deleting the original background sound of the first video clip and the original background sound of the second video clip; and uniformly adding the target background sound to the first video clip and the second video clip.

An embodiment of the present disclosure also provides a video merging device, including: a clip acquisition module, configured to acquire a first video clip and a second video clip which are to be merged; an image processing module, configured to perform image processing on the first video clip and the second video clip, wherein the first video clip after the image processing and the second video clip after the image processing have a same picture display effect, and wherein the picture display effect includes image quality and/or picture style; an audio processing module, configured to perform audio processing on the first video clip and the second video clip, wherein the first video clip after the audio processing and the second video clip after the audio processing have a same background sound; and a clip merging module, configured to merge the first video clip after the image processing and the audio processing with the second video clip after the image processing and the audio processing.

An embodiment of the present disclosure also provides an electronic equipment, including: a processor; and a memory configured to store executable instructions executable by the processor; wherein the processor is configured to read the executable instructions from the memory and execute the instructions to implement the video merging method provided by the embodiment of the present disclosure.

An embodiment of the present disclosure also provides a computer-readable storage medium including a computer program stored therein, wherein the computer program is configured to execute the video merging method provided by the embodiment of the present disclosure.

In the above technical solutions provided by the embodiments of the present disclosure, first, obtaining a first video clip and a second video clip which are to be merged, and then performing image processing and audio processing on the first video clip and the second video clip respectively, wherein the first video clip after the image processing and the second video clip after the image processing have a same picture display effect (image quality and/or picture style); the first video clip after the audio processing and the second video clip after the audio processing have a same background sound; finally, merging the first video clip after the image processing and the audio processing with the second video clip after the image processing and the audio processing. Through the above method, the picture display effect and background sound of the two video clips to be merged can be unified, so that merging transition of the two video clips is more natural, the merged video is more coherent, obvious sense of fragmentation existing in the merged video in the prior art is effectively alleviated, and an overall visual effect of the merged video to the user is improved.

It should be understood that the content described in this section is not intended to identify key or important features of the embodiments of the present disclosure, nor is it used to limit the scope of the present disclosure. The other features of the present disclosure will be easily understood through the following instructions.

BRIEF DESCRIPTION OF DRAWINGS

The accompanying drawings, which are incorporated in and constitute a part of the specification here, illustrate embodiments consistent with the present disclosure and together with the description, serve to explain the principles of the present disclosure.

In order to more clearly illustrate the technical solution of the embodiments of the present disclosure, the drawings necessary for the description of the embodiments or the prior art will be briefly described. It is obvious that other drawings can be obtained by those ordinary skilled in the art without creative labors.

DETAILED DESCRIPTION

In order to understand the above objectives, features and advantages of the present disclosure more clearly, the technical solution of the present disclosure will be further described below. It should be noted that the embodiments of the present disclosure and the features in the embodiments can be combined with each other without conflict.

In the following description, many specific details are set forth in order to fully understand the present disclosure, but the present disclosure may be practiced in other ways than those described herein; obviously, the embodiments in the specification are only part of the embodiments of the present disclosure, not all of them.

The applicant found through research that shooting conditions (such as a precision of a shooting equipment, a shooting environment, professionalism of a shooting personnel, etc.) or post-processing techniques (such as image editing, filter processing, etc.) of two videos are mostly different. For example, comparing clips from film and television dramas with clips from personal videos, there is a big difference in image performance and audio performance; and if the clips from the film and television dramas and the clips from personal videos are directly merged together, there will be an obvious sense of fragmentation. In the same way, most other videos with different shooting conditions/post-processing techniques will have varying degrees of fragmentation problems in a case of merging them together, so that an overall visual effect for a user is poor. In order to alleviate this problem, embodiments of the present disclosure provide a video merging method, a device, an equipment and a medium, which will be described in detail below.

Figure 1:
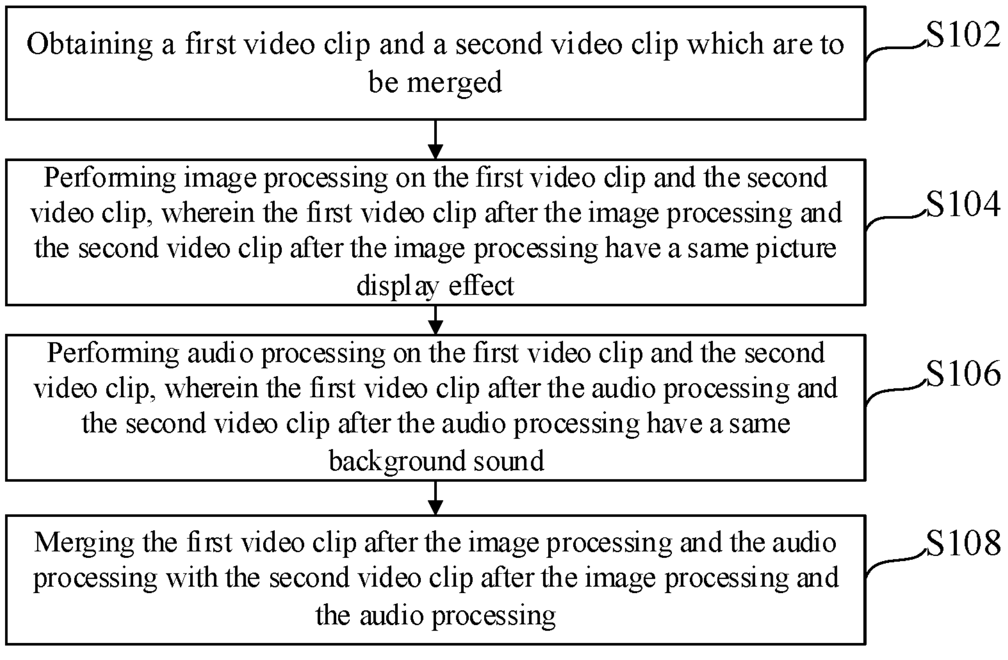
FIG. 1 is a schematic flow chart of a video merging method provided by an embodiment of the present disclosure.

FIG. 1 is a schematic flow chart of a video merging method provided by an embodiment of the present disclosure, this method can be performed by a video merging device, in which the device can be implemented by using software and/or hardware, and can generally be integrated in an electronic equipment. As shown in FIG. 1, the method mainly includes the following steps S102 to S108:

Step S102: obtaining a first video clip and a second video clip which are to be merged.

In practical applications, the first video clip and the second video clip may come from different videos, e.g., one is from a film and television work and the other one is from a personal video, the embodiments of the present disclosure do not limit the sources and shooting conditions of the first video clip and the second video clip, any two video clips that need to be merged can be used. By merging different video clips, a better dramatic effect can be achieved. For example, the film and television work can be cut into multiple film and television clips, and a user can shoot matching video clips based on the contents of these film and television clips, finally, all the clips are merged together in chronological order (or the order of event development), so that a plot with contrast and vitality can be created. It can be understood that any two video clips to be merged can be used as the first video clip and the second video clip.

Step S104, performing image processing on the first video clip and the second video clip so that the first video clip after the image processing and the second video clip after the image processing have a same picture display effect, in which the picture display effect includes an image quality and/or a picture style.

Considering that the two main influencing factors of the picture display effect include the image quality and the picture style, in some implementations, it can be considered that the picture display effect includes the image quality and/or the picture style. The image quality (also referred to as picture quality) can be directly characterized by High Dynamic Range (HDR) or Low Dynamic Range (LDR), and can also be characterized by data that directly affects the image quality, such as resolution. The picture style (also referred to as image style) is an overall effect expressed through one or more factors such as color tone, brightness, color contrast, clarity, etc., style names corresponding to different effects can be set in advance, such as Hong Kong and Taiwan style, fresh style, retro style, daily life style, and the like. In practical applications, the shooting conditions and image processing methods (such as filter processing) of different videos are mostly different, thus the final picture style is also different. For example, taking filters as an example, videos processed with different filters have different picture styles. In the embodiment of the present disclosure, the picture display effect can be characterized by the image quality and the picture style.

In some embodiments, the above image processing includes image quality unification processing and/or picture style unification processing, for example, the target picture display effect can be determined firstly; then, the original picture display effect of the first video clip and the original picture display effect of the second video clip are converted into the target picture display effect, thus a unified display effect of the two video clips is achieved.

Step S106, performing audio processing on the first video clip and the second video clip so that the first video clip after the audio processing and the second video clip after the audio processing have a same background sound.

In addition to the inconsistent display effects such as image quality and picture style, the difference between the background sounds of the two video clips is also the main reason why the synthesized video is more fragmented and the transition is unnatural, both of which result in that the merging of two video clips gives people a sense of sensory fragmentation. In some embodiments, the background sound can be understood as other sounds (such as environmental noise) except specified types of sounds (such as human voices, etc.). For example, if one video clip has a noisy background sound while another video clip has a simple background sound, merging two video clips directly together often creates an uncomfortable feeling. Taking full consideration of the above situations, embodiments of the present disclosure perform the audio processing on the first video clip and the second video clip. In some embodiments, the audio processing includes background sound unifying processing. Exemplarily, an original background sound of the first video clip and an original background sound of the second video clip may be obtained firstly; and the target background sound can be determined; then both the original background sound of the first video clip and the original background sound of the second video clip are converted into the target background sound, thus the effect of unifying the background sounds of the first video clip and the second video clip is achieved.

Step S108: merging the first video clip after the image processing and the audio processing and the second video clip after the image processing and the audio processing.

In some implementations, the picture display effect of the first video clip and the picture display effect of the second video clip can be unified into the target picture display effect, and the background sound of the first video clip and the background sound of the second video clip are unified into the target background sound, thus the picture display effect and the background sound of the processed first video clip and the picture display effect and the background sound of the processed second video clip are consistent.

Through the above method, the picture display effect and background sound of the two video clips to be merged can be unified, so that the merging transition of the two video clips is more natural, and the merged video is more coherent, thus the obvious sense of fragmentation existing in the merged video in the prior art is effectively alleviated, and the overall visual effect of the merged video to the user is improved.

In practical applications, before the above steps S104 and S106, the images and audios of the first video clip and the second video clip can be split, so that the images of the first video clip and the second video clip are individually unified, and the audios of the first video clip and the second video clip are individually unified; after the unified processing, the unified and processed images and audios can be synthesized, thus the final merged video is obtained.

In some implementations, the embodiments of the present disclosure provide the following two implementations for determining the target picture display effect:

(1) Using the preset picture display effect as the target picture display effect. That is, the target picture display effect can be preset according to needs or preferences, for example, the target image quality and the target picture style can be preset, and finally the two video clips are unified into the preset target picture display effect. The advantage of this method is that it is relatively simple to implement, and no matter what kind of picture display effects the first video clip and the second video clip have, only the target picture display effect needs to be set in advance in actual applications so that the two video clips to be merged can be unified according to the target picture display effect.

(2) Determining the target picture display effect based on the original picture display effect of the first video clip and the original picture display effect of the second video clip. The advantage of this approach is that it is more flexible, and the corresponding target picture display effect can be determined based on the actual situation of the first video clip and the second video clip; that is, the determined target picture display effect is related to the original picture display effect of the first video clip and the original picture display effect of the second video clip, so that the display effect is easily accepted by users and the user experience is better.

In some embodiments, taking the picture display effect including image quality and picture style as an example, the original picture display effect includes original image quality and original picture style; the target picture display effect includes target image quality and target picture style. In the above steps, the target image quality and the target picture style may be determined based on the original image quality and the original picture style of the first video clip and the original image quality and the original picture style of the second video clip. The target image quality can be one of the original image qualities of the two video clips, or it can be different from the original image qualities of the two video clips; in the same way, the target picture style can be one of the original picture styles of the two video clips, or it can be different from the original picture styles of the two video clips, which can be determined based on the actual situations, and is not limited herein.

In some specific implementation examples, the step of determining the target picture display effect based on the original picture display effect of the first video clip and the original picture display effect of the second video clip can be performed with reference to the following step a to step c:

Step a: selecting one of the original image quality of the first video clip and the original image quality of the second video clip as the target image quality.

In some implementations, one of the original image quality of the first video clip and the original image quality of the second video clip can be selected as the target image quality according to a preset quality selection strategy; in which the quality selection strategy includes: quality selection based on user instructions, or quality selection based on an image quality comparison result between the first video clip and the second video clip. For ease of understanding, the following is an expansion of explanation:

In a case that the quality selection strategy is quality selection based on user instructions, a prompt can be initiated to the user, the user selects the required image quality from the first video clip and the second video clip, and the target image quality is determined based on the user's selection result.

In a case that the quality selection strategy is quality selection based on the image quality comparison result between the first video clip and the second video clip, it can be preset that the better image quality from the first video clip and the second video clip is selected as the target image quality, so as to provide users with better viewing effects; for example, the image quality of the first video clip is HDR, and the image quality of the second video clip is LDR, HDR is better than LDR, then HDR can be selected as the target image quality. Of course, a poorer image quality can also be selected as the target image quality based on considerations such as traffic/processing speed, which can be set according to the actual situation and is not limited herein.

Step b: selecting one of the original picture style of the first video clip and the original picture style of the second video clip as the target picture style.

In some implementations, one of the original picture style of the first video clip and the original picture style of the second video clip can be selected as the target picture style according to a preset style selection strategy, in which the style selection strategy includes: style selection based on user instructions, style selection based on video sources, or style selection based on clip sorting positions. For ease of understanding, the following is an expansion of explanation:

In a case that the quality selection strategy is style selection based on user instructions, a prompt can be initiated to the user, the user selects the desired picture style from the first video clip and the second video clip, and determines the target picture style based on the user's selection results.

In a case that the quality selection strategy is style selection based on video sources, the preferred video source can be set in advance, the picture style corresponding to the video clip from the preferred video source is used as the target picture style; for example, video sources include movies, TV series and user personal works, assuming that the source of the first video clip is a film and television drama, and the source of the second video clip is the user's personal work, and if the film and television drama source is preset to be selected preferably, the picture style of the first video clip will be used as the target picture style.

In a case that the quality selection strategy is style selection based on clip sorting positions, the selection criteria for the sorting positions can be set in advance. For example, the picture style corresponding to the top-ranked video clip is selected as the target picture style. Exemplarily, assuming that the first video clip is located in front of the second video clip (that is, the first video clip is played first and then the second video clip is played), then the picture style corresponding to the first video clip is selected preferably as the target picture style. Of course, the picture style corresponding to the lower-ranked video clip can also be selected as the target picture style, which can be flexibly set according to actual needs and is not limited herein.

Step c: determining the target picture display effect based on the target image quality and the target picture style. In some implementations, the target picture display effect includes the target image quality and the target picture style.

Through the above step a to step c, the target picture display effect can be determined more reasonably, and the target image quality and the target picture style in the target picture display effect are related to the original image quality and the original picture style of the first video clip and the original image quality and the original picture style of the second video clip, so that the subsequent unified processing of the first video clip and the second video clip is smoother, and is easily accepted by users.

After the target picture display effect is determined, both the original picture display effect of the first video clip and the original picture display effect of the second video clip can be converted into the target picture display effect. That is, the display effect of the first video clip after processing and the display effect of the second video clip after processing are both the target picture display effect.

In some implementations, it can be implemented by referring to the following steps 1 to 3:

Step 1: based on the original picture display effect of the first video clip and the original picture display effect of the second video clip, determining the original picture display effect that is inconsistent with the target picture display effect, and using the inconsistent original picture display effect as the picture display effect to be converted. It can be understood that the target picture display effect may be one of the original picture display effect of the first video clip and the original picture display effect of the second video clip, so it is only necessary to select the original picture display effect that is inconsistent with the target picture display effect as the object to be processed.

Step 2: using a preset image quality conversion algorithm to convert the original image quality in the picture display effect to be converted into the target image quality in the target picture display effect; in which the image quality conversion algorithm includes a conversion algorithm between LDR and HDR. In this implementation, LDR and HDR are mainly used as characterization methods of the image quality. This conversion algorithm between LDR and HDR contains the conversion algorithm for converting LDR to HDR, and the conversion algorithm for converting HDR to LDR.

In some implementations, in order to present a better display effect to the user, assuming that the target image quality is HDR, if LDR is present in the original image quality, it is necessary to use the above-mentioned method that convert LDR to HDR. For ease of understanding, embodiments of the present disclosure provide a conversion algorithm for converting LDR into HDR, which can be implemented by using an HDR algorithm network model.

Figure 2:
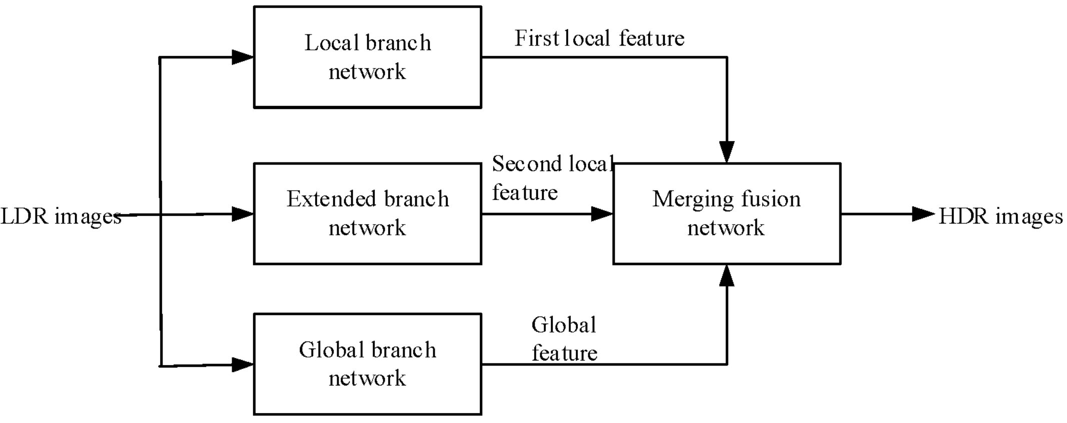
FIG. 2 is a schematic structural diagram of an HDR network model provided by an embodiment of the present disclosure.

FIG. 2 is a schematic structural diagram of an HDR network model, which mainly includes a local branch network, an extended branch network and a global branch network which are in parallel, as well as a merging fusion network connected with each of the local branch network, the extended branch network and the global branch network respectively. LDR images are input to the local branch network, the extended branch network and the global branch network respectively. Feature extraction is performed on the LDR image through the local branch network, to obtain a first local feature; feature extraction is performed on the LDR image through the extended branch network, to obtain a second local feature, in which the second local feature is more specific than the first local feature; and feature extraction is performed on the LDR image through the global branch network, to obtain a global feature. Then the first local feature, the second local feature and the global feature can all be input to the merging fusion network, and a HDR image is finally obtained by merging and merging the three features. In the specific implementation, the local branch network, the extended branch network and the global branch network can all be composed of a full convolution module. Exemplarily, an input of the global branch network is a 256*256 image, which is extracted into 1*1*64 feature through calculation of multiple convolution modules, and this feature contains the global feature of the input image. The global branch network needs to perform down-sampling in a case of extracting the global feature, while the local branch network and the extended branch network do not perform the down-sampling in a case of extracting features so that the local features of the image are better maintained, and the size of the finally generated local features is consistent with the input image. The merging fusion network can include a merging fusion layer and a convolution layer, the merging fusion layer can be used to merge and fuse the features output by the three network branches, and the convolution layer can be used to restore the merged and fused features into HDR images through convolution operations.

In addition, embodiments of the present disclosure further provide a training method for an HDR network model, which can be implemented specifically using supervised learning. For example, a batch of HDR image training samples can be obtained first, exemplarily, a batch of original HDR images can be collected first; during the training process, the original HDR images are randomly selected and randomly cropped, thus the effect of sample size amplification is achieved, and a plurality of HDR image samples are obtained; then a single-frame exposure operator can be used to convert the finally obtained HDR image samples into LDR images, so that HDR and LDR image sample pairs are established. The HDR network model to be trained is used to convert the LDR image samples to obtain HDR images; a loss value between the HDR image output by the HDR network model and the HDR image sample (real HDR image) is calculated based on the preset loss function, and the loss value represents degree of difference between the HDR image output by the HDR network model and the HDR image sample; based on the loss value, a gradient descent algorithm is used to optimize the parameters of the HDR network model, and the training is ended in a case that the loss value meets the preset conditions; at this time, the HDR network model can better convert the LDR image into an expected HDR image.

It should be noted that the above HDR network model is only an illustration and should not be regarded as a limitation; and in practical applications, any algorithm or model that can convert LDR images into HDR images can be used.

It is to be understood that in a case of merging a clip from film and television dramas with a clip from personal videos, since the image quality of film and television dramas is usually HDR while the image quality of personal videos is usually LDR, the clip from personal videos can be converted into HDR through the above method, thus the difference in image quality between the two clips is eliminated.

Step 3: using a preset style migration algorithm to migrate the target picture style in the target picture display effect to the picture display effect to be converted to ensure that the original picture style of the picture display effect to be converted is adjusted to match the target picture style, the matching between the adjusted picture style and the target picture style can be understood as: the similarity reaches a preset level.

In some implementations, the style migration algorithm includes a color migration algorithm or a style feature migration algorithm implemented based on a neural network model. For ease of understanding, exemplary descriptions are given below.

It is to be understood that color is a major factor affecting the style of the picture, therefore style migration can be achieved through color migration. The color migration algorithm refers to migrating the colors in the target picture display effect to the picture display effect to be converted, for example, for a brief overview, assuming that colors on a reference picture are transferred to a target picture. During specific implementation, the reference picture and the target picture can first be converted into LAB space (also referred to as Lab color space), then the mean values and the standard deviations of the pixels of the reference picture and the target picture in the LAB space are obtained respectively; the mean value of the target picture is subtracted from each pixel value in the target picture, and the difference value as obtained is multiplied by a pre-calculated ratio (that is, the ratio between the standard deviations of the reference picture and the target picture); finally, the mean value of the reference picture is added; in this way, the original colors of the target picture can be adjusted, and the adjusted color performance of the target picture is generally similar to the color performance of the reference picture.

The above-mentioned color migration method has a small amount of calculation and is easy to implement, and can make two video clips roughly aligned in colors, thus the above-mentioned color migration method can be better applied to devices with limited data processing capabilities such as mobile phones. In order to achieve better style migration effect, the style feature migration algorithm based on the neural network model can be used, that is, it is implemented by using deep learning algorithms. Exemplarily, embodiments of the present disclosure also provide an implementation of a style migration model.

Figure 3:
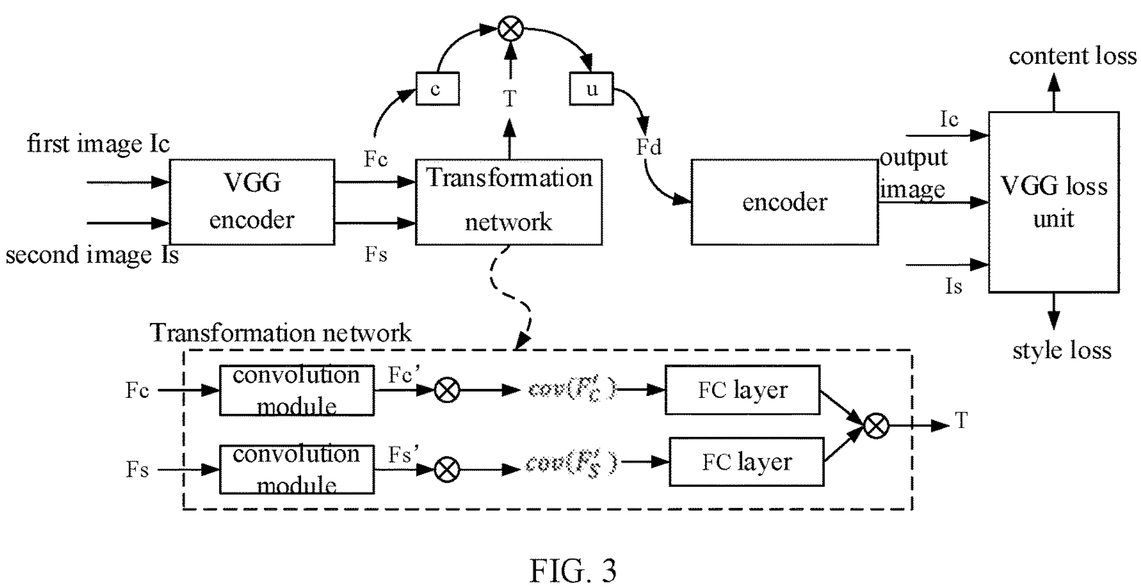
FIG. 3 is a schematic structural diagram of a style migration model provided by an embodiment of the present disclosure.

FIG. 3 shows a schematic structural diagram of a style migration model, which mainly includes a VGG encoder, a transformation network and a decoder. Furthermore, FIG. 3 also illustrates an internal structure of the transformation network. The principle of the style migration model is explained below with reference to FIG. 3.

The first image Ic and the second image Is are input to the VGG encoder, aiming to migrate the style of the second image Is to the first image Ic. For example, the first image Ic may be a video frame image of a video taken by a user, the second image Is may be a screenshot selected from a film or television drama. The VGG encoder performs feature extraction on the first image Ic and the second image Is respectively, and obtains the feature Fc and the feature Fs; then the transformation network is used to fuse the feature Fc and the feature Fs to obtain a new feature Fd, the feature Fd includes both the content feature of the first image Ic and the style feature of the second image Is; finally, the feature Fd is restored to an RGB image through the decoder (that is, the output image in FIG. 3). In addition, FIG. 3 also illustrates the specific principles inside the transformation network; Fc goes through the convolution module (including multiple convolution layers) for feature extraction to obtain Fc', Fc' is matrix multiplied by itself to obtain cov(Fc'), and cov(Fc') passes through the FC layer (fully connected layer) to obtain a first extracted feature; in the same way, Fs goes through the convolution module to obtain Fs', Fs' is matrix multiplied by itself to obtain cov(Fs'), and cov(Fs') passes through the FC layer (fully connected layer) to obtain a second extracted feature; after matrix multiplication of the first extracted feature and the second extracted feature, a matrix transpose T can be obtained. In addition, c in FIG. 3 represents a compress operation, and u represents a decompress operation.

The output image of the style migration model is expected to be consistent in content with the first image Ic (similarity reaches a specified degree), and be consistent in style with the second image Is (similarity reaches a specified level). In order to achieve this purpose, the loss function required for training the style migration model consists of two components (see VGG loss unit in FIG. 3), including content loss and style loss. During specific implementation, the output image can be input into the VGG encoder again to extract content features and style features respectively; by comparing the loss between the content feature of the output image and the content feature of the first image Ic, and comparing the loss between the style feature of the output image and the style feature of the second image Is, the network parameters of the style migration model are trained. Through the style migration model obtained after training, the content features of the final output image can be consistent with the content features of the first image Ic, and the style features of the final output image may be consistent with the style features of the second image Is.

It should be noted that the above style migration model is only an illustrative illustration and should not be regarded as a limitation, and in practical applications, any algorithm or model that can achieve style migration can be used.

Through the above steps 1 to 3, the original picture display effect of the first video clip and the original picture display effect of the second video clip can be converted into the target picture display effect, to achieve the purpose of unifying the picture display effect, thus the transition between the two video clips after merging is more natural, and the sense of integrity is stronger.

In some implementations, embodiments of the present disclosure provide specific implementations for audio processing of the first video clip and the second video clip, which can be implemented with reference to the following steps A to C.

Step A: obtaining the original background sound of the first video clip and the original background sound of the second video clip.

In some implementations, a first specified type of sound contained in the first video clip may be extracted, and the other sounds except the first specified type of sound are used as the original background sound of the first video clip; and a second specified type of sound contained in the second video clip is extracted, and the other sounds except the second specified type of sound are used as the original background sound of the second video clip. In practical applications, the first specified type of sound and the second specified type of sound may be the same or different. For example, the first specified type of sound and the second specified type of sound may both be human voices, or both may be musical instrument sounds; or one can be a human voice and the other one is an instrument sound. The above is an illustration only and should not be considered as a limitation. In addition, the first specified type of sound may include one or more types of sounds, and the second specified type of sound may also include one or more types of sounds, then sounds (such as environmental noise, noise, etc.) of other sound types except the specified types are used as original background sounds.

In practical applications, taking the audio of the first video clip as an example, an audio track separation can be performed based on the first specified type of sound, so that the first specified type of sound is separated, and the remaining sounds are regarded as the original background sound of the first video clip. For example, in a case that the first specified type of sound is a human voice, the human voice is separated from the audio of the first video clip, and the remaining sounds, such as environmental noise, are regarded as the original background sound.

Step B, determining the target background sound. In some implementations, the embodiments of the present disclosure further provide the following two implementations for determining the target background sound.

(1) Using the preset background sound as the target background sound. That is, the target background sound can be preset according to needs or preferences. The target background sound can be background music or uniform environmental noise, and can also be set as blank (mute), the present disclosure does not limit the specific form of the target background sound. Finally, the background sounds of the two video clips are unified into the preset target background sounds. The advantage of this method is that it is relatively simple to implement, and no matter what kind of background sounds the first video clip and the second video clip are, it only needs to set the target background sound in advance in actual applications so that the audio effects of the two video clips to be merged can be unified according to the target background sound.

For example, in a case that the target background sound is a background music, in practical applications, a default background music can be added automatically or a user-selected background music can be added, which is not limited herein. By adding background music, on the basis of unifying the background sounds of the two video clips, the merged video can also be made more appealing and dramatic. Moreover, by way of example, in a case that the target background sound is blank, only the required sound type is retained in the two video clips (such as only the human voice is retained), and the playing effect of the audio is made purer by removing environmental noise from the respective clips. In addition, by way of example, in a case that the target background sound is a preset environmental noise, the playing effect of the audio is more natural and realistic. The desired target background sound can be set according to actual needs, the above are only examples and should not be regarded as limitations.

(2) Determining the target background sound based on the original background sound of the first video clip and the original background sound of the second video clip. The advantage of this approach is that it is more flexible, and the corresponding target background sound can be determined based on the actual situation of the first video clip and the second video clip; that is, the determined target background sound is related to the original background sound of the first video clip and the original background sound of the second video clip, which is easily accepted by users and has a better user experience.

In some specific implementation examples, the following two methods can be used to determine the target background sound based on the original background sound of the first video clip and the original background sound of the second video clip.

Method 1: selecting one of the original background sound of the first video clip and the original background sound of the second video clip as the target background sound. Specifically, one of the original background sound of the first video clip and the original background sound of the second video clip can be selected as the target background sound according to a preset background sound selection strategy. The background sound selection strategy includes: background sound selection based on user quality, background sound selection based on video sources, background sound selection based on clip sorting positions, or background sound selection based on background sound comparison result between the first video clip and the second video clip, for example, the background sound with the lower noise among the two video clips is given priority as the target background sound. The implementation of the other background sound selection strategies can refer to the aforementioned style selection strategies, which will not be described in detail herein.

Method 2: fusing the original background sound of the first video clip and the original background sound of the second video clip, to obtain the target background sound. In this method, the background sounds of the two video clips can be directly fused into the target background sound, so that the target background sound contains all background sound elements of the two video clips. Any sound fusion algorithm can be used and is not limited herein.

It should be understood that the above is only an exemplary description, in practical applications, any method that can determine the target background sound can be used.

Step C: converting the original background sound of the first video clip and the original background sound of the second video clip into the target background sound.

For example, the embodiment of the present disclosure provides a relatively simple implementation: deleting the original background sound of the first video clip and the original background sound of the second video clip; and adding target background sound to the first video clip and the second video clip uniformly. Through the above method, the background sound can be quickly converted, to achieve unified and natural transition effect of the background sounds of the two video clips.

In summary, by performing a unified image effect processing, a unified audio effect processing and a merging process on the first video clip and the second video clip, the merged video can be displayed to the user in a unified manner according to the target picture display effect and the target background sound, and the merged video is coherent and natural in both picture and audio effects, so that the obvious sense of fragmentation existing in the merged video in the prior art is effectively alleviated, and the overall sensory effect of the merged video to the user is improved.

The above video merging method provided by the embodiments of the present disclosure can be flexibly applied to any two video clips that need to be merged. For example, two independent videos can be merged directly according to the above video merging method; two independent videos can also be divided into multiple video clips, then the multiple video clips are alternately merged according to the above video merging method; in addition, a plurality of video clips from different sources can also be merged in a certain order. In any of these cases, the above-mentioned video merging method provided by the embodiment of the present disclosure can be used to merge the two video clips to be merged, and finally the merged merged video (also referred to as fused video) is obtained.

Figure 4:
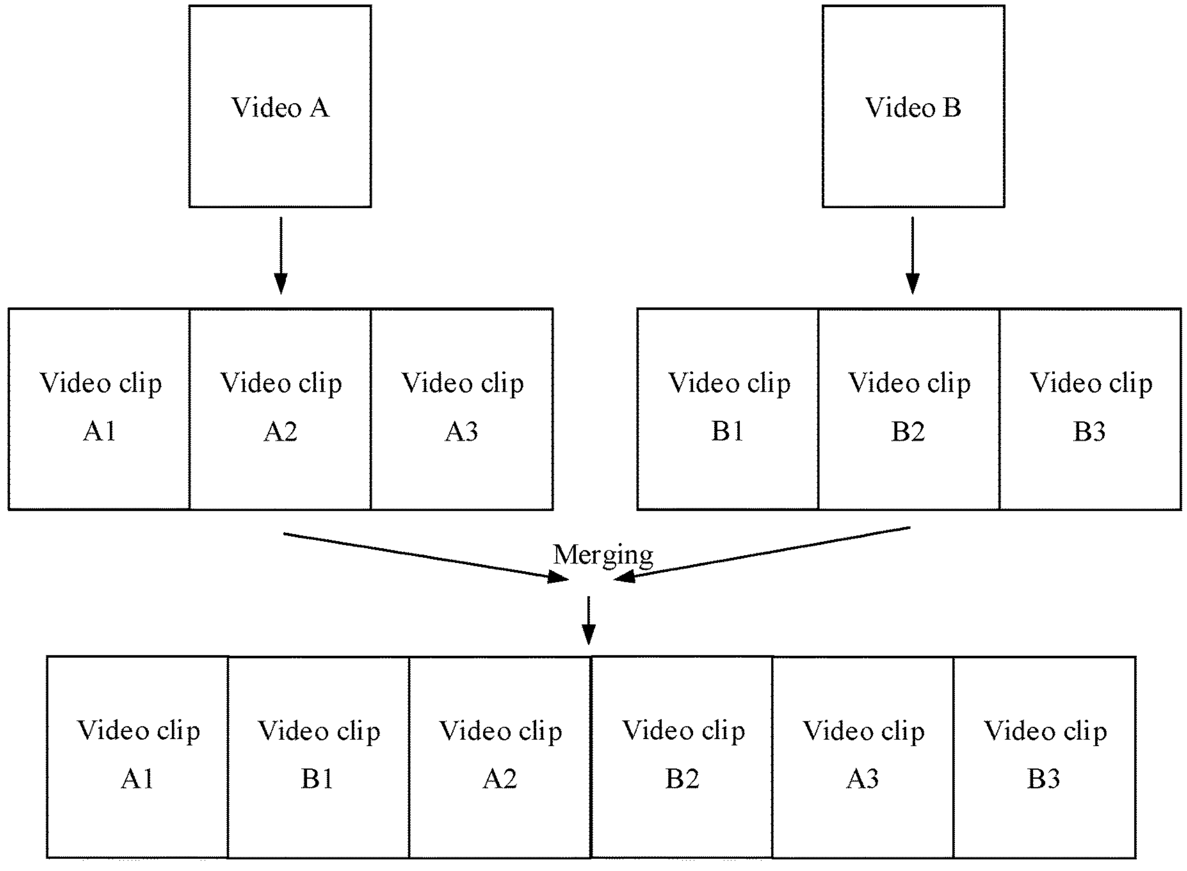
FIG. 4 is a schematic diagram of video merging provided by an embodiment of the present disclosure.

For ease of understanding, the embodiment of the present disclosure provides an application scenario of the above video merging method. Referring to a schematic diagram of video merging shown in FIG. 4, video A and video B are illustrated, in which video A is divided into video clips A1, A2 and A3, video B is divided into video clips B1, B2 and B3, the video A and the video B are alternately merged, and the merged video is A1B1A2B2A3B3. It can be understood that the merging of any two adjacent video clips can be achieved by using the above video merging method, and the final merged video has better overall coherence and consistency, thus the video merging transition can be made more natural, and the sense of fragmentation caused by merging in the existing technology can be effectively alleviated.

The embodiment of the present disclosure does not limit the sources of the two video clips to be merged. In some implementations, video A is part of a film and television drama, and video B is a personal creative work, the target picture style is the picture style of video A, and the target audio track category is vocal track; then a plurality of video clips cut from the video A and a plurality of video clips cut from the video B are merged together in a manner of A1B1A2B2A3B3. In this way, the effect of dialogue between film and television drama characters and real-life characters can be achieved, thus a better dramatic effect can be achieved. The segmentation method of video clips (segmentation nodes, segment length, etc.) can be determined according to actual needs, and will not be limited in the embodiments of the present disclosure.

Furthermore, embodiments of the present disclosure further provide an implementation of the above video merging method. Referring to the flowchart of a video merging method shown in FIG. 5, which illustrates that Video {Ai} is split into audio and video, to obtain the video V-Ai and the audio A-Ai; Video {Bi} is split into audio and video, to obtain video V-Bi and audio A-Bi; and the video V-Ai and the video V-Bi are formed into video pictures to be merged, the audio A-Ai and the audio A-Bi are formed into audios to be merged. By performing video normalization (that is, unifying the picture display effect) on video V-Ai and video V-Bi, the processed video V'-Ai and processed video V'-Bi can be obtained. The processed video V'-Ai and processed video V'-Bi are subjected to video transition (which can be understood as a video merging method), so that they can be merged together coherently according to the specified transition form. By performing audio normalization (that is, unifying the background sound) on audio A-Ai and audio A-Bi, the processed audio A'-Ai and processed audio A'-Bi can be obtained. The processed audio A'-Ai and processed audio A'-Bi are subjected to audio transition (which can be understood as an audio merging method), so that they can be merged together in a coherent manner according to the specified transition form. Afterwards, the video and audio obtained after the transition merging can be subjected to an audio and video synthesis, and finally a video is output. In addition, FIG. 5 briefly illustrates the specific implementations of video normalization and audio normalization. In the video normalization process, one or more of the several factors that affect the display effect of the picture can be normalized, for example, normalizing one or more influencing factors such as resolution, HDR (that is, corresponding to the aforementioned image quality), style (corresponding to the aforementioned picture style), and color. Understandably, style generally involves colors, but the colors are listed alone in FIG. 5, which means that in practical applications, normalization can also be performed based on colors only. In the audio normalization process, one or more of the several factors that affect the audio playing effect can be normalized, for example, normalizing one or more factors such as gain, human voice, and noise; specifically, the processing can be, for example, gain adjustment, vocal extraction and noise reduction. Among them, the human voice corresponds to the aforementioned specified type of sound, and the noise can be regarded as the background sound other than the human voice, thus noise reduction/denoising processing is required. It is to be understood that the environmental noise will vary greatly depending on the shooting scenes of different videos, and a direct merging will produce a greater sense of dissonance and fragmentation, so an audio track separation can be performed on the videos to be merged, for example, vocal tracks and environmental noise tracks are separated therefrom; in some specific implementations, only the human voices of the two videos are retained, and the transition of the merged video can be made more realistic and natural by removing the environmental noise.

Figure 5:
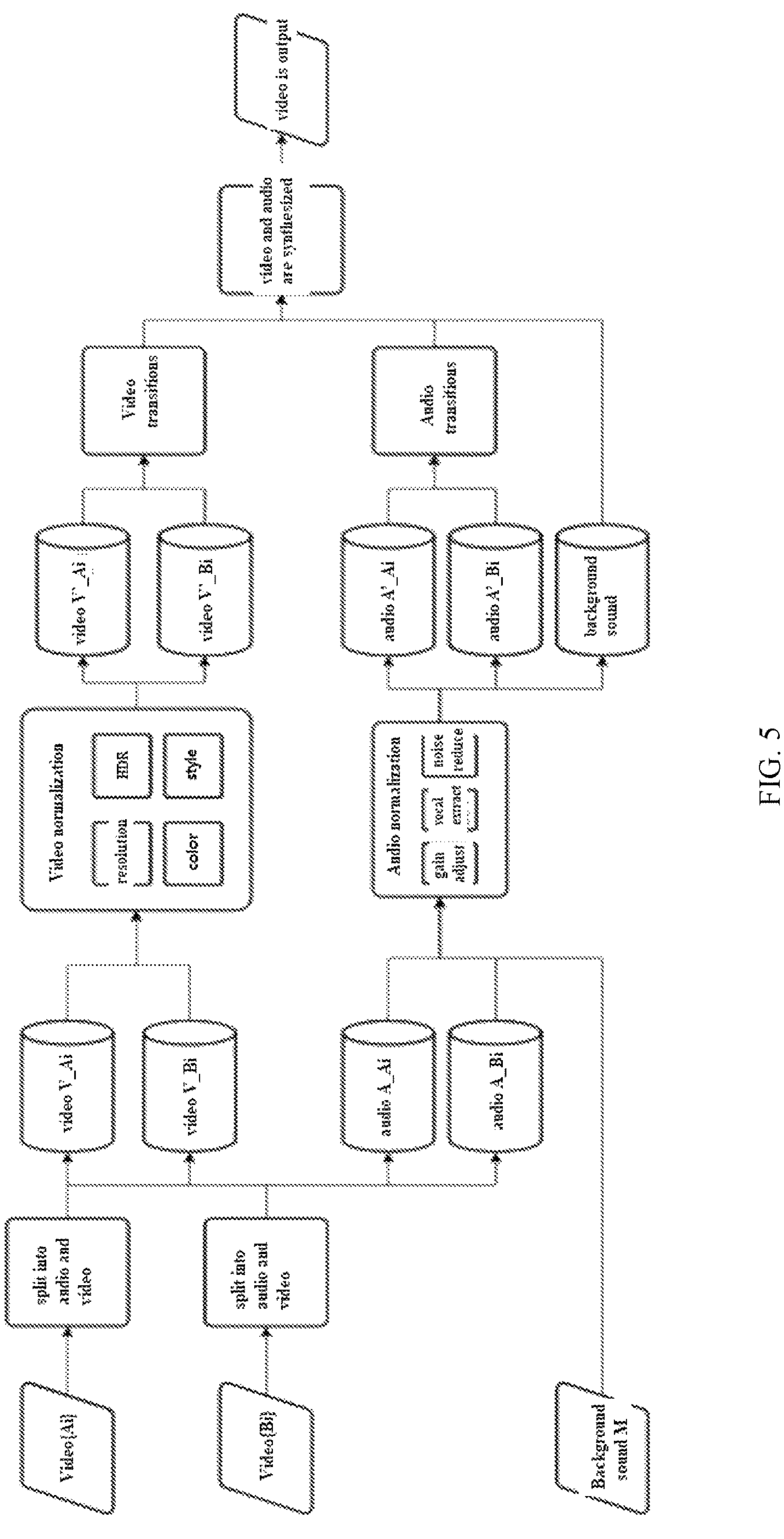
FIG. 5 is a schematic flow chart of a video merging method provided by an embodiment of the present disclosure.

In addition, FIG. 5 is only a simple example of several influencing factors in the normalization processing of audio and video, and these influencing factors are not listed exhaustivity and should not be regarded as a limitation.

Furthermore, in order to enhance the atmosphere, a background music is further added in FIG. 5. By removing the environmental noise from each video and adding the background music uniformly, not only can the background sounds of the two video clips be unified, but also a better artistic effect can be further created.

In summary, the video merging method provided by the embodiments of the present disclosure can make the merging transition of two video clips more natural, and make the merged video more coherent, so that the overall sensory effect of the merged video to the user is effectively improved.

Figure 6:
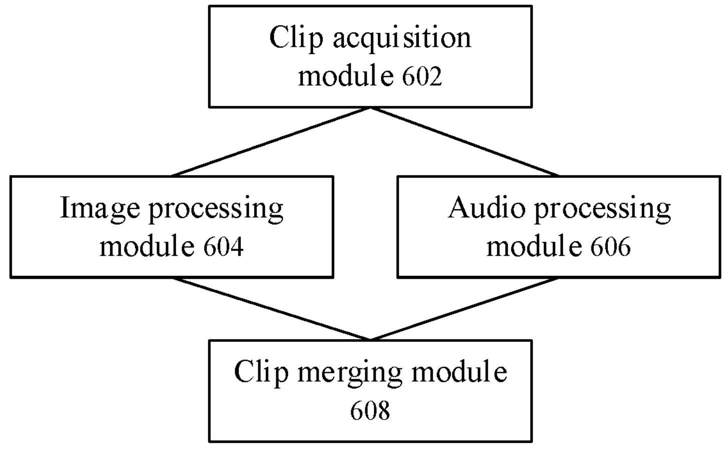
FIG. 6 is a schematic structural diagram of a video merging device provided by an embodiment of the present disclosure.

Corresponding to the aforementioned video merging method, embodiments of the present disclosure provide a video merging device. FIG. 6 is a schematic structural diagram of a video merging device provided by an embodiment of the present disclosure. The device can be implemented by software and/or hardware, and generally can be integrated in an electronic equipment. As shown in FIG. 6, the device includes:

- a clip acquisition module 602, configured to acquire the first video clip and the second video clip to be merged;
- an image processing module 604, configured to perform image processing on the first video clip and the second video clip, so that the first video clip after the image processing and the second video clip after the image processing have a same picture display effect; and the picture display effect includes an image quality and/or a picture style;
- an audio processing module 606, configured to perform audio processing on the first video clip and the second video clip to ensure that the first video clip after the audio processing and the second video clip after the audio processing have a same background sound; and
- a clip merging module 608, configured to merge the first video clip after the image processing and the audio processing and the second video clip after the image processing and the audio processing.

Through the above device, the picture display effect and background sound of the two video clips to be merged can be unified, so that the merging transition of the two video clips is more natural, the merged video is more coherent, the obvious sense of fragmentation existing in the merged video in the prior art is effectively alleviated, and the overall sensory effect of the merged video to the user is improved.

In some implementations, the image processing module 604 is specifically configured to: determine the target picture display effect; and convert the original picture display effect of the first video clip and the original picture display effect of the second video clip into the target picture display effect.

In some implementations, the image processing module 604 is specifically configured to: use the preset picture display effect as the target picture display effect; or determine the target picture display effect according to the original picture display effect of the first video clip and the original picture display effect of the second video clip.

In some implementations, the picture display effect includes the image quality and the picture style;

the image processing module 604 is specifically configured to: select one of the original image quality of the first video clip and the original image quality of the second video clip as the target image quality; select one of the original picture style of the first video clip and the original picture style of the second video clip as the target picture style; and determine the target picture display effect based on the target image quality and the target picture style.

In some implementations, the image processing module 604 is specifically configured to: select one of the original image quality of the first video clip and the original image quality of the second video clip as the target image quality according to a preset quality selection strategy; in which the quality selection strategy includes: quality selection based on user instructions, or quality selection based on an image quality comparison result between the first video clip and the second video clip.

In some implementations, the image processing module 604 is specifically configured to: select one of the original picture style of the first video clip and the original picture style of the second video clip as the target picture style according to a preset style selection strategy; in which the style selection strategy includes: style selection based on user instructions, style selection based on video sources, or style selection based on clip sorting positions.

In some implementations, the image processing module 604 is specifically configured to: determine the original picture display effect that is inconsistent with the target picture display effect based on the original picture display effect of the first video clip and the original picture display effect of the second video clip, and use the inconsistent original picture display effect as the picture display effect to be converted; use a preset image quality conversion algorithm to convert the original image quality in the picture display effect to be converted into the target image quality in the target picture display effect, in which the image quality conversion algorithm includes the conversion algorithm between LDR and HDR; use a preset style migration algorithm to migrate the target picture style in the target picture display effect to the picture display effect to be converted, so that the original picture style of the picture display effect to be converted is adjusted to match the target picture style.

In some implementations, the audio processing module 606 is specifically configured to: obtain an original background sound of the first video clip and an original background sound of the second video clip; determine a target background sound; and convert the original background sound of the first video clip and the original background sound of the second video clip into the target background sound.

In some implementations, the audio processing module 606 is specifically configured to: extract a first specified type of sound contained in the first video clip, and use other sounds except the first specified type of sound as the original background sound of the first video clip; extract a second specified type of sound contained in the second video clip, and use other sounds except the second specified type of sound as the original background sound of the second video clip.

In some implementations, the audio processing module 606 is specifically configured to: use the preset background sound as the target background sound; or determine the target background sound according to the original background sound of the first video clip and the original background sound of the second video clip.

In some implementations, the audio processing module 606 is specifically configured to: select one of the original background sound of the first video clip and the original background sound of the second video clip as the target background sound; or fuse the original background sound of the first video clip and the original background sound of the second video clip, to obtain the target background sound.

In some implementations, the audio processing module 606 is specifically configured to: delete the original background sound of the first video clip and the original background sound of the second video clip; and uniformly add the target background sound to the first video clip and the second video clip.

The video merging device provided by the embodiments of the present disclosure can execute the video merging method provided by any embodiment of the present disclosure, and has functional modules and beneficial effects corresponding to the executed method.

Those skilled in the art can clearly understand that for the convenience and simplicity of description, for the specific working process of the device embodiment described above, reference can be made to the corresponding process in the method embodiment, which will not be described in detail herein.

Figure 7:
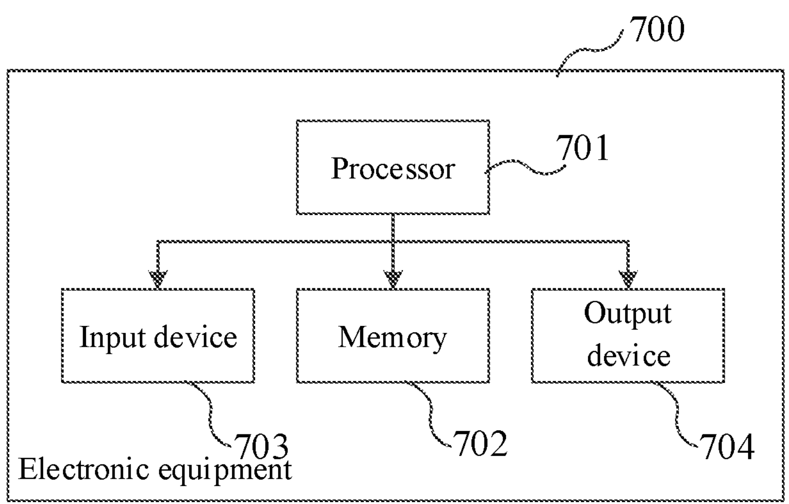
FIG. 7 is a schematic structural diagram of an electronic equipment provided by an embodiment of the present disclosure.

Embodiments of the present disclosure provide an electronic equipment, and the electronic equipment includes: a processor; and a memory configured to store executable instructions of the processor; the processor is configured to read the executable instructions from the memory and execute the instructions to implement any one of the above video merging methods. FIG. 7 is a schematic structural diagram of an electronic equipment provided by an embodiment of the present disclosure. As shown in FIG. 7, the electronic equipment 700 includes one or more processors 701 and a memory 702.

The processor 701 may be a central processing unit (CPU) or other form of processing unit with data processing capabilities and/or instruction execution capabilities, and the processor 701 can control other components in the electronic equipment 700 to perform desired functions.

The memory 702 may include one or more computer program products, the computer program product may include various forms of computer-readable storage medium, such as volatile memory and/or non-volatile memory. The volatile memory may include, for example, random access memory (RAM) and/or cache memory (cache), the non-volatile memory may include, for example, read-only memory (ROM), hard disk, and flash memory. One or more computer program instructions may be stored on the computer-readable storage medium, and the processor 701 may execute the program instructions, so that the video merging method and/or other desired functions of the embodiments of the present disclosure described above are implemented. Various contents such as input signals, signal components, noise components, etc. may also be stored in the computer-readable storage medium.

In one example, the electronic equipment 700 may further include: an input device 703 and an output device 704, and these components are interconnected by a bus system and/or other forms of connection mechanisms (not shown).

In addition, the input device 703 may also include, for example, a keyboard, a mouse, and the like.

The output device 704 can output various information to the outside, including determined distance information, and direction information. The output device 704 may include, for example, a display, a speaker, a printer, a communication network and its connected remote output devices.

Of course, for simplicity, only some of the components in the electronic equipment 700 related to the present disclosure are shown in FIG. 7, and components such as buses, and input/output interfaces, are omitted. In addition, the electronic equipment 700 may also include any other appropriate components depending on specific application situations.

In addition to the above method and device, embodiments of the present disclosure may also be a computer program product including computer program instructions. When executed by a processor, the computer program instructions cause the processor to execute the video merging method provided by the embodiments of the present disclosure.

The computer program product may be written with program codes for performing the operations of embodiments of the present disclosure in any combination of one or more programming languages. The above-mentioned programming languages include object-oriented programming languages such as Java, C++, and also include conventional procedural programming languages such as the "C" programming language or similar programming languages. The program code may be executed entirely on the user's computer, partly on the user's computer, as a stand-alone software package, partly on the user's computer and partly on a remote computer, or entirely on the remote computer or server.

In addition, embodiments of the present disclosure may also be computer-readable storage medium, on which computer program instructions are stored. When executed by a processor, the computer program instructions cause the processor to execute the video merging method provided by the embodiments of the present disclosure.

The computer-readable storage medium may be any combination of one or more readable mediums. The readable medium may be a readable signal medium or a readable storage medium. The readable storage medium may include, for example, but is not limited to, electrical, magnetic, optical, electromagnetic, infrared, or semiconductor systems, devices, or apparatus, or any combination of the above. More specific examples (non-exhaustive list) of readable storage medium include: an electrical connection with one or more wires, a portable disk, a hard disk, a random-access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination of the above.

Embodiments of the present disclosure also provide a computer program product including computer programs/instructions. When executed by a processor, the computer program/instructions can implement the video merging method in the embodiments of the present disclosure.

It should be noted that in the present disclosure, relational terms such as "first" and "second" are only used to distinguish one entity or operation from another entity or operation, and do not necessarily require or imply that there is any such actual relationship or order between these entities or operations. Moreover, the terms "comprising", "including" or any other variation thereof are intended to cover non-exclusive inclusion, so that a process, method, article or equipment including a series of elements includes not only those elements, but also other elements not explicitly listed or elements inherent to such process, method, article or equipment. Without more restrictions, the element defined by the phrase "including one" does not exclude that there are other identical elements in the process, method, article or equipment including the element.

The above are only specific embodiments of the present disclosure, so that those skilled in the art can understand or realize the present disclosure. Many modifications to these embodiments will be obvious to those skilled in the art, and the general principles defined herein can be implemented in other embodiments without departing from the spirit or scope of the present disclosure. Therefore, the present disclosure will not be limited to these embodiments herein, but is to be in accordance with the widest scope consistent with the principles and novel features disclosed herein.

The invention claimed is:

1. A video merging method, comprising:

obtaining a first video clip and a second video clip which are to be merged;

performing image processing on the first video clip and the second video clip, wherein the first video clip after the image processing and the second video clip after the image processing have a same picture display effect, and wherein the picture display effect comprises an image quality and/or a picture style;

performing audio processing on the first video clip and the second video clip, wherein the first video clip after the audio processing and the second video clip after the audio processing have a same background sound; and merging the first video clip after the image processing and the audio processing with the second video clip after the image processing and the audio processing;

the performing audio processing on the first video clip and the second video clip comprises:

obtaining an original background sound of the first video clip and an original background sound of the second video clip, comprising: extracting a first specified type of sound contained in the first video clip, and using other sounds except the first specified type of sound as the original background sound of the first video clip, and extracting a second specified type of sound contained original background sound of the second video clip;

determining a target background sound; and converting both the original background sound of the first video clip and the original background sound of the second video clip into the target background sound.

2. The method according to claim 1, wherein the performing image processing on the first video clip and the second video clip comprises:

determining a target picture display effect; and converting both an original picture display effect of the first video clip and an original picture display effect of the second video clip into the target picture display effect.

3. The method according to claim 2, wherein the determining the target picture display effect comprises:

using a preset picture display effect as the target picture display effect; or determining the target picture display effect according to the original picture display effect of the first video clip and the original picture display effect of the second video clip.

4. The method according to claim 3, wherein the picture display effect comprises the image quality and the picture style;

the determining the target picture display effect according to the original picture display effect of the first video clip and the original picture display effect of the second video clip comprises:

selecting one of an original image quality of the first video clip and an original image quality of the second video clip as a target image quality;

selecting one of an original picture style of the first video clip and an original picture style of the second video clip as a target picture style; and determining the target picture display effect based on the target image quality and the target picture style.

5. The method according to claim 4, wherein the selecting one of the original image quality of the first video clip and the original image quality of the second video clip as the target image quality comprises:

selecting one of the original image quality of the first video clip and the original image quality of the second video clip as the target image quality according to a preset quality selection strategy; wherein the quality selection strategy comprises: quality selection based on user instructions or quality selection based on an image quality comparison result between the first video clip and the second video clip.

6. The method according to claim 4, wherein the selecting one of the original picture style of the first video clip and the original picture style of the second video clip as the target picture style comprises:

selecting one of the original picture style of the first video clip and the original picture style of the second video clip as the target picture style according to a preset style selection strategy; wherein the style selection strategy comprises: style selection based on user instructions, style selection based on video sources, or style selection based on clip sorting positions.

7. The method according to claim 2, wherein the converting the original picture display effect of the first video clip and the original picture display effect of the second video clip into the target picture display effect comprises:

determining the original picture display effect that is inconsistent with the target picture display effect based on the original picture display effect of the first video clip and the original picture display effect of the second video clip, and using the inconsistent original picture display effect as a picture display effect to be converted;

converting the original image quality in the picture display effect to be converted into the target image quality in the target picture display effect by using a preset image quality conversion algorithm; wherein the image quality conversion algorithm comprises a conversion algorithm between Low Dynamic Range (LDR) and High Dynamic Range (HDR); and migrating the target picture style in the target picture display effect to the picture display effect to be converted by using a preset style migration algorithm, so that the original picture style of the picture display effect to be converted is adjusted to match the target picture style.

8. The method according to claim 1, wherein the determining the target background sound comprises:

using a preset background sound as the target background sound; or determining the target background sound based on the original background sound of the first video clip and the original background sound of the second video clip.

9. The method according to claim 8, wherein the determining the target background sound based on the original background sound of the first video clip and the original background sound of the second video clip comprises:

selecting one of the original background sound of the first video clip and the original background sound of the second video clip as the target background sound; or fusing the original background sound of the first video clip and the original background sound of the second video clip to obtain the target background sound.

10. The method according to claim 1, wherein the converting both the original background sound of the first video clip and the original background sound of the second video clip into the target background sound comprises:

deleting the original background sound of the first video clip and the original background sound of the second video clip; and uniformly adding the target background sound to the first video clip and the second video clip.

11. An electronic equipment, comprising:

a processor; and a memory configured to store executable instructions executable by the processor;

wherein the processor is configured to read the executable instructions from the memory and execute the instructions to implement the video merging method according to claim 1.

* * * * *